US005899373A

United States Patent [19]
Kamei

[11] Patent Number: 5,899,373
[45] Date of Patent: May 4, 1999

[54] WIRE MEASURING APPARATUS

[75] Inventor: Kazuaki Kamei, Yamato, Japan

[73] Assignee: Molex Incorporated, Lisle, Ill.

[21] Appl. No.: 09/016,826

[22] Filed: Jan. 30, 1998

[51] Int. Cl.[6] .......... B65H 20/00; B65H 20/24; F16H 7/00

[52] U.S. Cl. .......... 226/110; 226/182; 226/187; 226/188; 474/87

[58] Field of Search .......... 226/4, 33, 108, 226/109, 110, 139, 182, 185, 187, 188

[56] References Cited

U.S. PATENT DOCUMENTS

| | | | |
|---|---|---|---|
| 2,217,037 | 10/1940 | Abramoske | 474/87 |
| 2,638,341 | 5/1953 | Silver | 226/108 |
| 3,263,884 | 8/1966 | Doerfling | 226/33 X |
| 4,030,372 | 6/1977 | Miyamoto | 474/87 |
| 4,043,494 | 8/1977 | Bickford et al. . | |
| 4,064,729 | 12/1977 | Homery | 226/188 X |
| 4,135,378 | 1/1979 | Balon . | |
| 4,235,362 | 11/1980 | Hubenko | 226/187 X |
| 5,547,065 | 8/1996 | Watanabe et al. . | |

*Primary Examiner*—Michael Mansen
*Attorney, Agent, or Firm*—Charles S. Cohen

[57] ABSTRACT

An electrical wire length measuring apparatus is capable of minimizing any error of the wire feed amount of respective wire per each measurement cycle and can realize more accurate length measurement of the wires. The measuring apparatus includes a plurality of wire length measuring roller assemblies that are arranged in parallel arrangement to each other, but extend perpendicular to the wire feed direction. Each of the wire length measuring roller assemblies feed a single wire independent of each other. Each of the wire length measuring roller assemblies are driven by a corresponding toothed belt which in turn is driven by an associated motor. The arrangement of the motors permits the wire measuring roller assemblies to be positioned nearer the outlet end of the apparatus to minimize feeding error.

20 Claims, 6 Drawing Sheets

WIRE MEASURING APPARATUS

BACKGROUND OF THE INVENTION

The present invention relates generally to the production of electrical wire harnesses, and more specifically to a wire measuring apparatus that significantly reduces errors in measurement of the wires.

Many machines are known in the art for production of wire harnesses and those machines incorporate different apparatus for measuring wires. One apparatus is known for producing multiple wire harnesses and includes a plurality of wire supply reels that contain respective supplies of wire, a wire measuring device for measuring and feeding each such wire depending on the demand for the wires, guide means for guiding each of the wires downstream along the wire length, means for adjusting the pitch of the wires depending on the wire demand, a termination device for terminating electrical connectors to the opposing ends of the wires, and an ejection device for ejecting the completed harness.

The aforesaid wire measuring device is illustrated in FIG. 9 and includes a multiple roller assembly 101, 102, 103, 104 for each of the multiple wires 201, 202, 203, 204 used in the harness and includes the combination of a wire feed roller and a wire pressure roller. An electric motor is used as the means to drive each set of rollers in their respective rotation. A single drive motor is mounted directly to each pair of rollers. The size of these motors is bulky and therefore difficulty is encountered in arranging all of the required motors at the same position in the wire feeding direction. The narrow pitch of the wires is too small to permit the motors to be aligned in side-by-side order without causing interference between the casings of the motors and because the space in a direction transverse to the wire feed direction is limited.

Due to this interference problem, the wire drive motors are arranged in a staggered arrangement to avoid interference with each other. The measuring roller assemblies 101, 102, 103 and 104 for driving respective wires 201, 202, 203 and 204 are therefore arranged in a non-aligned, stepwise order as illustrated in FIG. 9. In such an arrangement, wire 201 has the longest length "A" between its corresponding wire measurement roller 101 and the outlet end 120 of the measuring device. Wire 202 has the second longest length "B" between its corresponding measurement roller assembly 102, while wire 203 has the third longest length "C" between its corresponding measurement roller assembly 103 and the outlet end 120. Lastly, the fourth wire 104 has the shortest length "D" between its corresponding measurement roller assembly 204 and the outlet end 120 of the measuring apparatus.

As an example of the deficiencies that occur in the use of the aforesaid wire measuring apparatus, it is assumed that wire 201 is fed in a length of 100 mm by its measuring roller assembly 101; wire 202 is fed in a length of 70 mm by its measuring roller assembly 102; wire 203 is fed in a length of 50 mm by its measuring roller assembly 103; and, wire 204 is fed in a length of 30 mm by its corresponding measuring roller assembly 104. The respective wires pass through the fore going wire guide means, a wire pitch adjusting device before being fed toward the pressure welding device. At this time, while each wire is fed through wire paths defined in the wire guide means, the wire pitch adjusting means and so forth with a certain clearance maintained between the wire and wall surface of the wire paths, each wire may encounter frictional forces due to contact with the walls and other surfaces of the wire path. If such frictional forces are exerted on the wires during the feeding thereof, the flexibility of the wires are likely to cause bowing or slackening during feeding.

The degree of bowing or slacking is most significant in the wire 201 that has the longest wire length "A" and is the least in the wire 204 that has the shortest wire length "D". Under these conditions, even when the respective measuring roller assemblies are driven accurately for times selected for feeding the respective lengths, i.e., 100 mm, 70 mm, 50 mm and 30 mm of the wires 201, 202, 203 & 204 by their corresponding respective measuring roller assemblies 101, 102, 103 & 104, the influence of interference between the wire and the peripheral surfaces of the wire paths that result in bowing or slacking by friction becomes most significant on the wire 201 fed in the length of 100 mm. Therefore, the feeding error in the wire 201 becomes much greater than that which may occur in wire 204. In each measurement cycle, greater measurement error tends to be caused in the wire having a greater feeding length than that in the wire having the smaller feeding length.

In view of the multiple wires that are processed in one cycle of the apparatus, greater error in the feed length should be caused in the wire having greater length than that having smaller length. Therefore, the magnitude of measurement error will fluctuate between the wires fed by the apparatus. Hence, correction of measurement error cannot be uniformly done and causes difficulty in correcting the measurement error.

Accordingly, the present invention is directed to a wire measuring apparatus in which errors of wire measurement are reduced.

SUMMARY OF THE INVENTION

An object of the present invention is to provide an electrical wire length measuring device that can minimize error of wire feeding of each wire within each wire measurement cycle and thereby realize more accurately measured wires.

Another object of the present invention is to provide a measuring technology in which fluctuation of wire feed error in respective wires in a multiple wire harness in one process cycle is minimized to facilitate uniform correction of the measured lengths of the wires.

These and other objects are accomplished by way of a wire measuring device that has in one principal aspect, a plurality of wire measuring roller assemblies that are arranged in parallel relationship with each other along a wire feed direction, each of the wire measuring roller assemblies independently feeding an individual wire, and a plurality of electric drive motors that are operatively connected to a corresponding length measuring roller assembly in order to drive and stop the assembly.

In another principal aspect, the present invention includes a plurality of wire length measuring roller assemblies that form a plurality of series of length measuring roller assembly groups extending parallel to each other along a wire feed direction for feeding respective, predetermined lengths of wires, each of the measuring roller assemblies independently feeding a single electrical wire and the measuring roller assembly groups being further aligned together along the pitch direction of the wires. A plurality of electrical drive motors are also provided for driving each corresponding length measuring roller assembly for selectively feeding and stopping corresponding lengths of wire, the motors being connected to the wire measuring roller assemblies by respective drive belts for transmitting the drive force of the motors to the wire measuring roller assemblies.

In another aspect of the present invention, the drive belts may be cogged or toothed belts and each wire measuring roller assembly includes a roller having complementary teeth formed thereon that engage the drive belts, and such teeth may be formed integrally with a wire feeding portion of the roller.

These and other objects, features and advantages of the present invention will become apparent from the following detailed description, taken in conjunction with the accompanying drawings, wherein like reference numerals refer to like parts.

BRIEF DESCRIPTION OF THE DRAWINGS

In the course of the following description of the detailed description, reference will be made to the attached drawings wherein like reference numerals identify like parts and wherein.

DETAILED DESCRIPTION OF THE PREFERRED EMBODIMENTS

The present invention is directed to an improved wire measuring apparatus particularly suitable for utilization in the assembly of wire harnesses. Referring first to FIGS. 1–4, a first embodiment of a wire measuring device is illustrated generally at 1. While not illustrated, the wire measuring device 1 is part of an overall wire harness assembly machine that includes a plurality of wire supply reels, each containing a supply of wire, a guide means for guiding respective wires 2 in their path through the machine and the wire measuring apparatus 1, means for adjusting the pitch (interval) between adjacent wires 2 depending on the need for the wires 2 in the completed harnesses, a terminating device for connecting the wire ends to respective terminals in connector elements and an ejecting device for ejecting the completed wire harnesses. The wires 2 used in assembly of such harnesses are conventional electrical wires having a center electrically conductive portion and an outer insulative portion surrounding the center portion.

Figure 1:
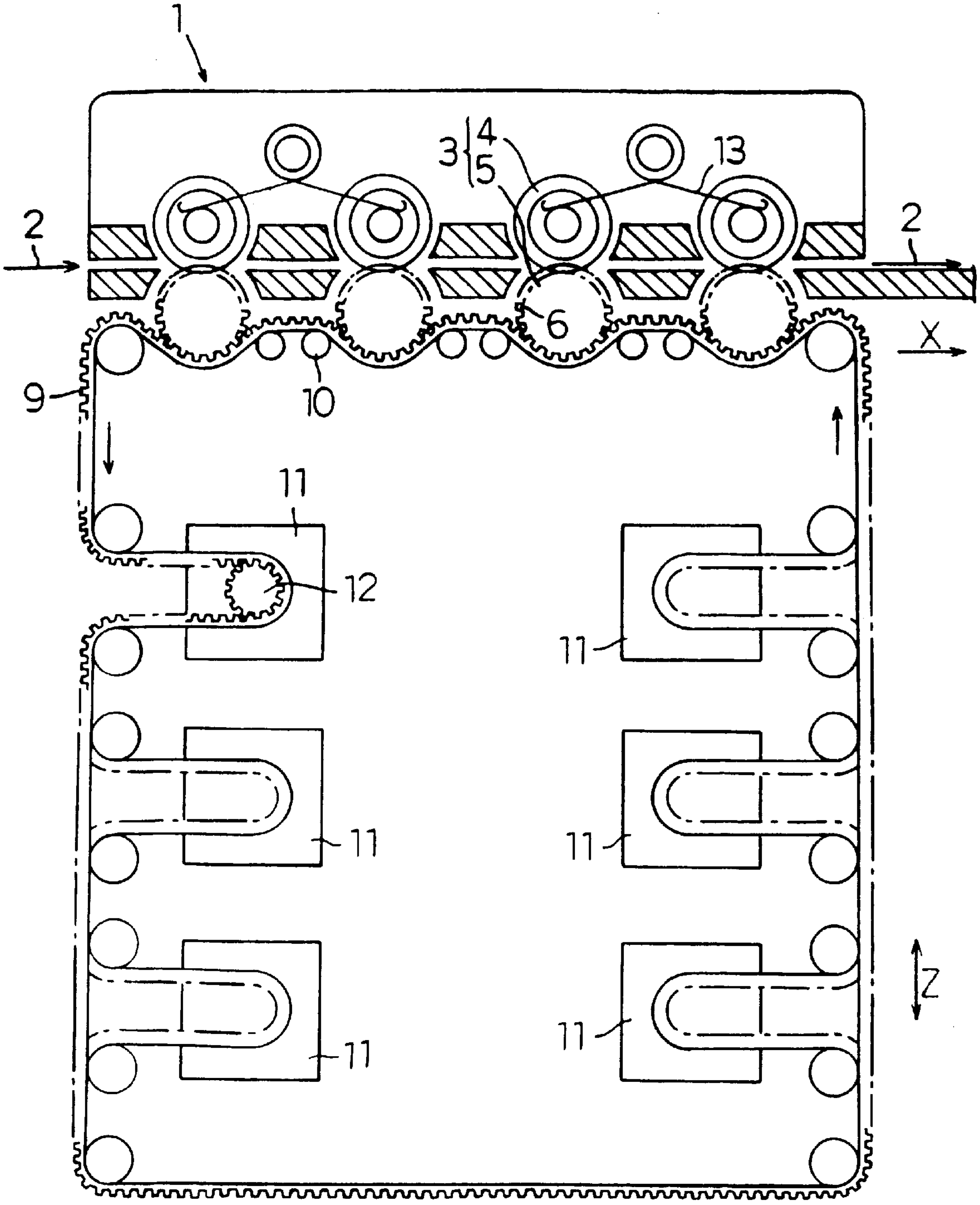
FIG. 1 is a side elevational view of a wire measuring apparatus constructed in accordance with the principles of the present invention.

The wire measuring device 1 includes a plurality of independent measuring roller assemblies 3, with six such assemblies being aligned together crosswise of the wires 2, that is, in the pitch direction Y which is transverse to the plane of the paper of FIG. 1 as well as transverse to the wire feed direction X. The measuring roller assembly groups in each respective series 3*a* are the same. Therefore, only one series of the wire measuring roller assemblies 3*a* will be discussed.

Figure 2:
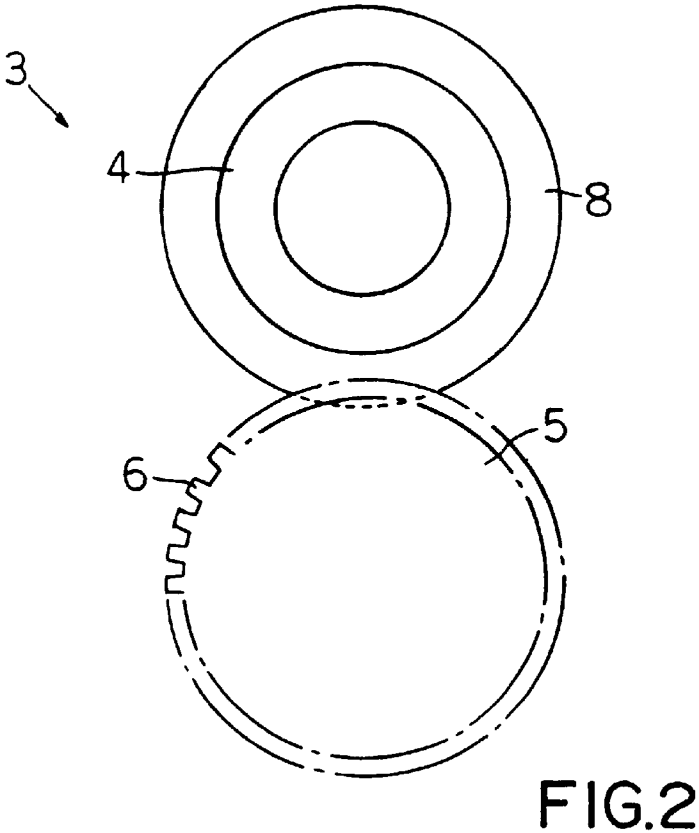
FIG. 2 is a side elevational view of one of the measuring roller assemblies utilized in the wire measuring apparatus of FIG. 1.
Figure 3:
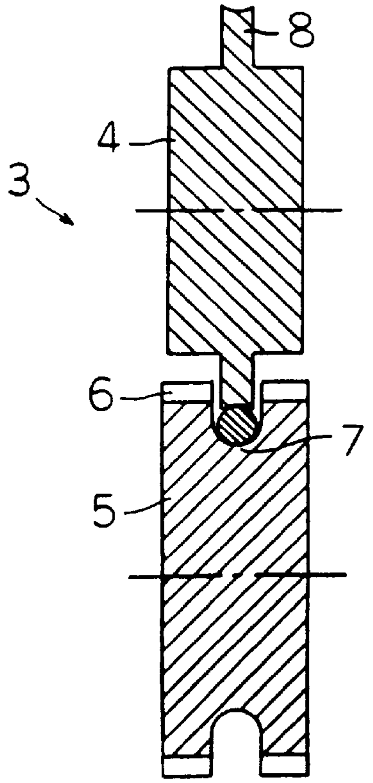
FIG. 3 is a sectional view of the measuring roller assembly of FIG. 2.

The one measuring roller assembly group 3*a* (FIG. 2) includes four identical measuring roller assemblies 3, and as shown best in FIGS. 2 and 3, each measuring roller assembly 3 includes a pressure roller 4 and a wire feed roller 5. The wire pressure roller 4 is located above the wire feed roller 5 for resiliently, or elastically, contacting the wire feed roller 5 under pressure from above. A series of teeth 6 are preferably formed on the peripheral edges of the wire feed roller 5 and the teeth may have a square or rectangular cross section. (FIG. 3.) The wire feed roller 5 has a wire feeding groove 7 formed on the circumference thereof generally centrally disposed between the wire feed roller teeth 6. The outer periphery of the wire pressure roller 4 includes a circular projection, or extension 8, that is partially received within the wire feed groove 7 and which exerts a desired pressure on the wires 2 present in the wire feed grooves 7. The wire pressure roller 4 may be resiliently biased toward the wire feed roller 5 by a suitable biasing means, such as the springs 13 illustrated in FIG. 1.

In order to drive the wire feed rollers 5 in their rotation during operation of the apparatus, a drive means, such as a cogged or toothed belt 9, is provided and in engagement with the lower teeth 6 of the wire feed rollers 5. Each of the cogged belts 9 may extend along the wire feed direction X to thereby meshes with four wire feed rollers 5 that make up one of the series of four measuring roller assemblies 3 arranged in order along the wire feed path X.

The toothed drive belt 9 is supported by a plurality of support, or idler pulleys 10, that are interspersed between the wire feed rollers 5 as shown. In order to provide sufficient drive, the drive belts 9 are operatively engaged to toothed output shafts or gears 12 of corresponding electrical motors 11. The driving force of the motors 11 are transmitted to their respective wire feed rollers 5 by way of the cogged drive belt 9. By rotating the wire feed rollers 5, each wire 2 is advanced in the feed direction X. Each such wire 2*a*, 2*b*, 2*c*, 2*d*, 2*e* & 2*f* is rotated independently of each other by their respective roller assemblies.

A single electric motor 11 is provided for each of the six series of measuring roller assemblies 3. These six motors 11 are arranged in a manner so as not to interfere with each other. In the embodiment illustrated in FIG. 1, the six motors 11 are arranged in two vertical columns, with three such motors 11 being in effect stacked together vertically along the travel path Z of the drive belts 9 so that the motors 11 and the wire measuring roller assemblies 5 are disposed in different planes of the apparatus 1. When the number of wires 2 being processed is increased along the direction of pitch, i.e., into the plane of the paper in FIG. 1, adjustment of the overall length of the cogged belt 9 in each series and optimizing the arrangement of the electric motors 11 can be arranged without causing any interference.

It will be appreciated that while the measuring apparatus 1 is illustrated in the Figures as feeding six individual wires 2, the apparatus 1 has the capability of feeding any number of wires 2. It is preferable that four wire measuring roller assemblies 3 be included and arranged along the length of the wire feed path X, but sufficient results may be obtainable with greater or less assemblies.

Figure 4:
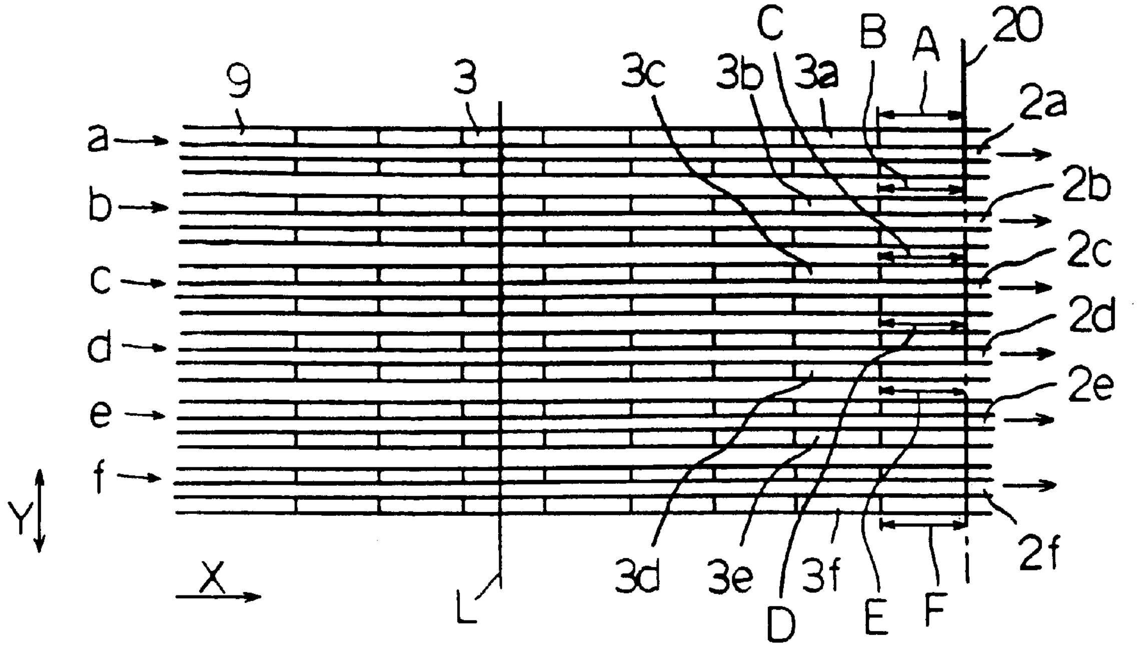
FIG. 4 is a diagrammatic plan view of the wire measuring apparatus of FIG. 1.

Turning now to FIG. 4, operation of the apparatus 1 will be explained. In FIG. 4, the six wire measuring roller assemblies are illustrated as arranged in side-by-side order along the pitch direction Y of the wires 2. Each of the measuring roller assemblies are identified by letters a, b, c, d, e and f. Similarly, the respective wires fed by these roller assemblies are indicated by 2*a,* 2*b,* 2*c,* 2*d,* 2*e* and 2*f.* The measuring roller assemblies of each wire path that are located closest to the outlet end 20 of the apparatus 1 are identified at 3*a,* 3*b,* 3*c,* 3*d,* 3*e* and 3*f.* These measuring roller assemblies are aligned along a common line L along the pitch direction Y that extends perpendicular to the wire feed direction X. In the embodiment illustrated respective wire measuring roller assemblies are also similarly arranged at the rear (toward the left in FIG. 4) of the measuring roller assemblies 3*a,* 3*b,* 3*c,* 3*d,* 3*e* and 3*f* in alignment with each other and in the pitch direction Y. The length of the wires 2 from the measuring roller assemblies 3*a,* 3*b,* 3*c,* 3*d,* 3*e* and 3*f* closest to the outlet end 20 of the apparatus 1 are indicated as A, B, C, D, E and F.

It is assumed that a wire 2*a* is measured in a length of 100 mm by the measuring roller assembly group a, while a wire 2*b* is measured in a length of 90 mm by the measuring roller assembly group b, while wire 2*c* is measured in a length of 80 mm by the measuring roller assembly group c, while the wire 2*d* is measured in a length of 70 mm by the measuring roller assembly group d, while the wire 2*e* is measured in a length of 60 mm by the measuring roller assembly group e, and the wire 2*f* is measured in a length of 50 mm by the measuring roller assembly group f. Each of the respective wires are fed through four measuring roller assemblies 3.

Before feeding toward the pressure welding device, the wires 2*a,* 2*b,* 2*c,* 2*d,* 2*e* and 2*f* pass through wire guide means and a wire pitch converting device and so forth. At this time, the wires are guided with a clearance with the peripheral wall surface of the wire guide means of the wire pitch converting device. It is possible that the wire has a frictional force exerted upon from the wire guide means and so forth. Because the wire is flexible, it is possible to cause bowing or slacking of the wire due to frictional forces encountered in the measuring thereof.

However, utilizing the first embodiment of the present invention as illustrated in FIG. 1, because the wire measuring assemblies 3*a,* 3*b,* 3*c,* 3*d,* 3*e* and 3*f* are not directly connected to the electric motors 11, but are driven entirely by the cogged belt 9, all of the wire length measuring roller assemblies 3*a,* 3*b,* 3*c,* 3*d,* 3*e* and 3*f* can be arranged closer near the outlet end 20 of the measuring apparatus 1. In particular, as viewed in plan view in FIG. 4, all of the wire length measuring roller assemblies 3*a,* 3*b,* 3*c,* 3*d,* 3*e* and 3*f* can be aligned along the line L as well as any other lines parallel to it. The resultant effect is that the wire measuring roller assemblies are arranged in alignment along the pitch direction Y of the wires 2.

In the construction set forth above, due to this alignment of the measuring roller assemblies 3*a,* 3*b,* 3*c,* 3*d,* 3*e* and 3*f* along a straight line L, even when any or all of the wires shall contact the measuring roller assemblies in such a manner as to apply a frictional force to the wires, no single wire of the wire series will only experience the bowing or slacking in greater magnitude than the other remaining wires.

It may be possible to also prevent wires from being fed from any one measuring roller assembly with a greater measurement error than that in any other measuring roller assembly during every wire feeding cycle.

Further, because the wire measuring roller assemblies 3*a,* 3*b,* 3*c,* 3*d,* 3*e* and 3*f* can not be arranged close and in the vicinity of the outlet end 20 of the apparatus 1, the lengths of the wires 2 to be extended from the roller assemblies can be made very short with respect to the entire length of the wire feed path to reduce bowing or slacking and thereby permit accurate wire measurement. In consideration of the multiple wire harnesses to be processed in one processing cycle, even if error is cause in the feeding of the respective wires A, B, C, D, E and F, the fluctuation of the error in each wire of the wire harnesses can be small. Thus, even when error is caused in the feeding amount of respective wires in the wire harness in one cycle, the fluctuation of magnitude of the error will be small. Because the amount of error in the wires becomes substantially the same, the amount for correcting the wire length can be the same to facilitate wire length correction.

Figure 5:
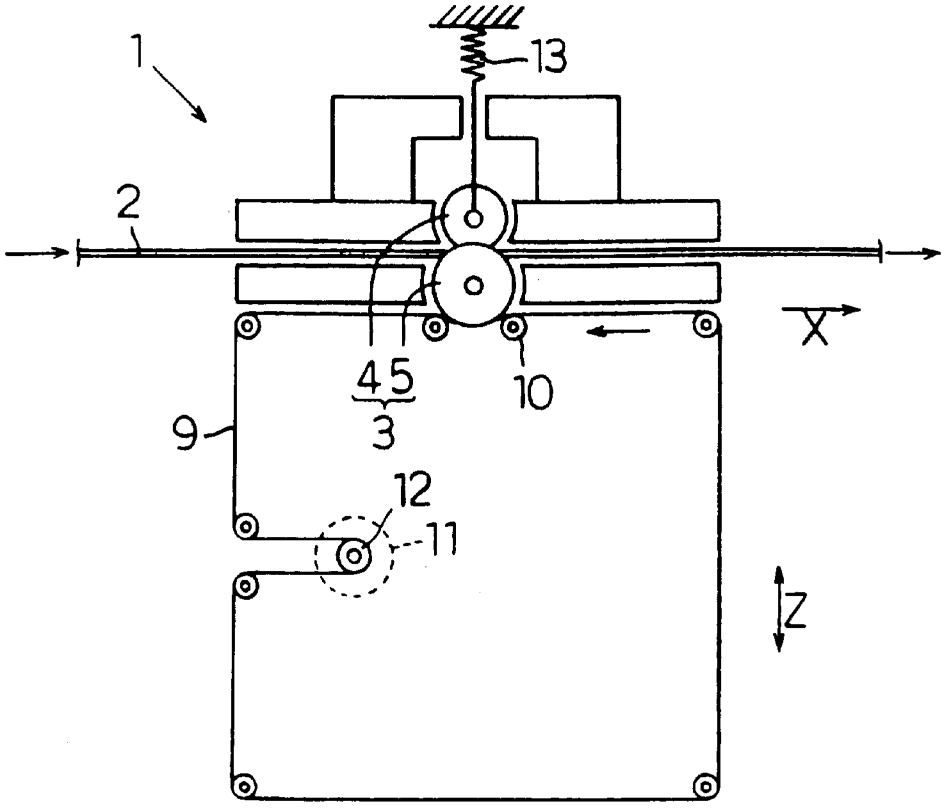
FIG. 5 is an elevational view of a second embodiment of a wire measuring apparatus constructed in accordance with the principles of the present invention.
Figure 6:
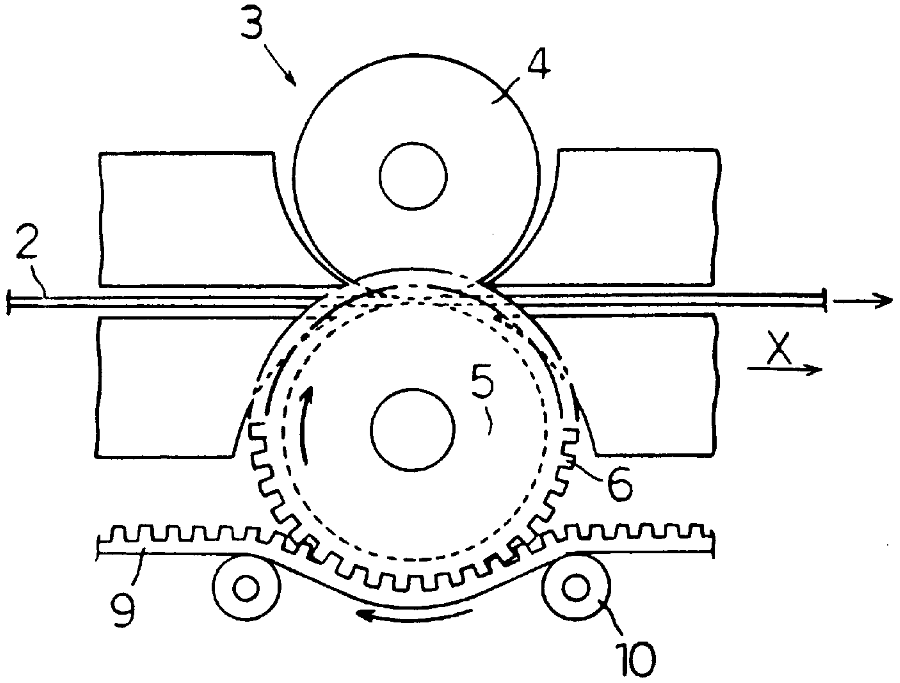
FIG. 6 is an enlarged elevational view of a measuring roller assembly utilized in the wire measuring apparatus of FIG. 5.

A second embodiment of a wire measuring apparatus according to the principles of the present invention is illustrated in FIGS. 5–8. In the first embodiment, six series of wire length measuring roller assembly groups are arranged in parallel relationship with each other, and in each such group, four length measuring roller assemblies 3 are arranged in alignment along the wire feeding direction Y. In contrast, the second embodiment utilizes two series of length measuring roller assembly groups arranged in parallel in the pitch direction. In each such roller assembly group series, only one length measuring assembly 3 is included. (FIG. 5.)

Figure 7:
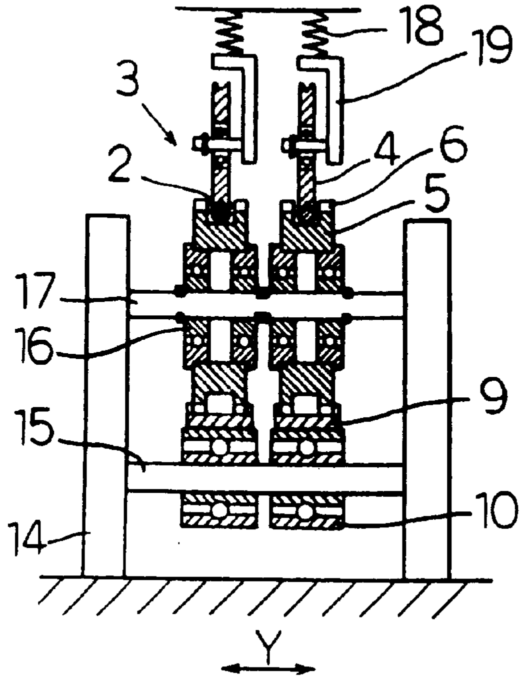
FIG. 7 is a sectional view of the roller assembly of FIG. 6.
Figure 8:
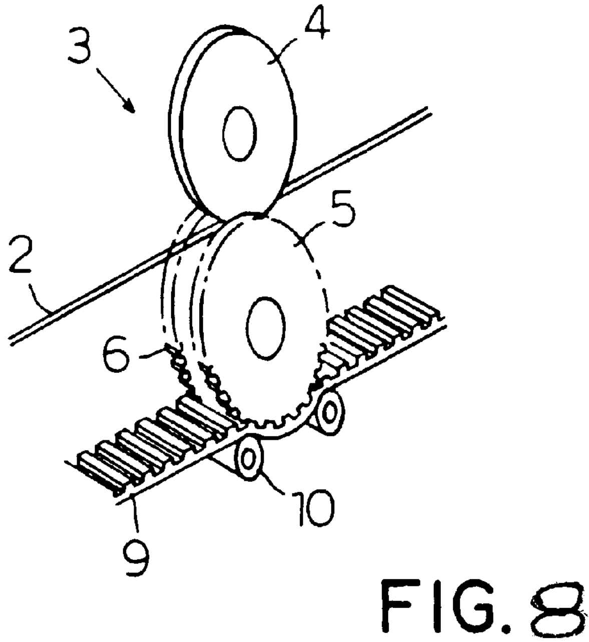
FIG. 8 is a perspective view of the measuring roller assembly of FIG. 5; and, FIG. 9 is a plan view of a conventional wire measuring apparatus.

Referring now to FIG. 7, a support pulley 10 is formed with a bearing and is mounted to a shaft 15 that extends between a pair of support walls 14. the wire feeding rollers 5 are also mounted on a shaft 17 that extends between the support walls 14 and the shaft 17 is rotatably supported on the support walls by way of bearings 16. The pressure rollers 4 are rotatably supported on support bodies 19 that are biased toward corresponding feeding rollers 5 by means of pressure springs 18.

It should be noted that in the first and second described embodiments, the respective wire length measuring roller assemblies are driven independently of one another by the power transmission means in the form of the toothed belts 9. A such, it is possible to employ independent gear trains for independent rotation of each series of measuring roller assembly groups. In this instance, each gear train is operatively connected to at least one electric motor 11 arranged along the vertical direction Z so that the wire length measuring roller assemblies 3 are aligned together in the wire pitch direction along a common line, such as L.

As set forth above and in accordance with the principles of the present invention, because respective series of the length measuring roller assemblies are aligned in the wire pitch direction, the distances between respective series of length measuring roller assemblies 3 and the outlet end 20 of the apparatus 1 can be made equal to each other. Therefore, when the wire is fed, it is not possible to feed the wire in one series of the wire measuring roller assembly group at a greater length than that in the other series of wire measuring roller assembly groups. Furthermore, because respective series of the wire measuring roller assembly groups are placed close to the outlet end 20 of the apparatus 1, the length of the wire extended from the apparatus 1 can be made shorter to significantly reduce any bowing or slacking of the wires 2. Still further, it will be appreciated that because the fluctuation of error of the feed amounts of wires between processing cycles is small, even if errors in the wire feed amounts occur, uniform correction for such measurement error may be accomplished because the fluctuation of the magnitude of the error is small. Therefore, the measurement of the length of the wires is very accurate.

Figure 9:
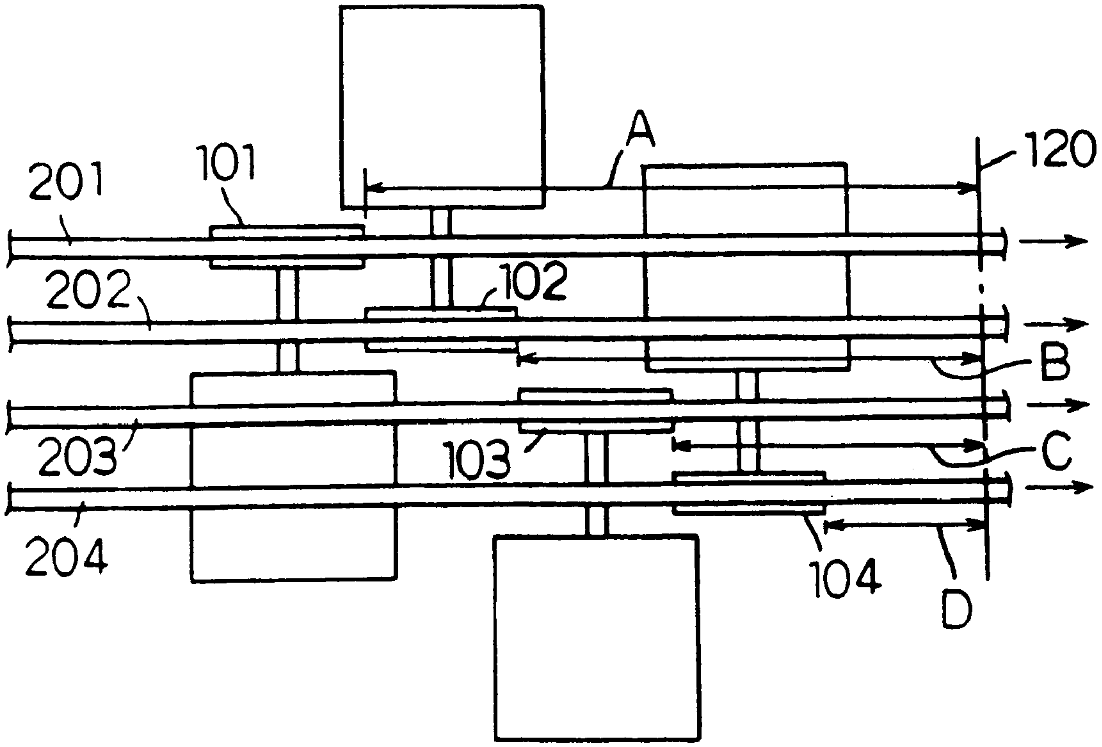

Also, because the wire length measuring roller assemblies are driven by their belts, it is much easier to align the measuring roller assemblies in the wire pitch direction. Thus, the present invention greatly facilitates the arrangement of a plurality of electric motors 11 in the apparatus 1 without causing interference between the motors 11 as would happen in the prior art apparatus of FIG. 9.

The present invention also provides a plurality of length measuring roller assemblies in each such group so that the wires 2 are supported in a stable manner. The pressure roller 4 maintains the wire 2 in the groove 7 of the feed roller 5 to thereby reduce the likelihood of the wires 2 catching on the walls of the rollers and bowing or slacking.

The measurement of the wire lengths are done in an accurate manner because transmission of power occurs smoothly between the motors 11, the cogged belt 9 and the teeth 6 of the wire feed roller 5. No slip will occur between the belt and the rollers which may result in inaccurate rotation of the roller 5 and feeding of the wire 2. The teeth 6 of the feed rollers 5 are integrally formed on the wire measuring roller 5 and thus there is little play in the roller 5 as compared to rollers where the teeth may be mounted on the outer peripheral surfaces such as by set screws and the like. The operational life of the measuring rollers 5 are therefore extended by the present invention.

While the preferred embodiments of the invention have been shown and described, it will be understood by those skilled in the art the changes or modifications may be made thereto without departing from the true spirit and scope of the invention.

I claim:

1. A multi-wire measuring apparatus for feeding and measuring a plurality of individual wires, each wire having a center electrical conductive portion and an outer insulative portion surrounding the center portion, the apparatus comprising: a plurality of wire measuring units arranged along a wire feed path of said apparatus, the wire feed path extending lengthwise of said apparatus, each of the wire measuring units including at least one wire drive assembly having a wire driving roller and a wire pressure roller, the wire driving roller having a groove disposed in an outer peripheral surface of said wire driving roller and the wire pressure roller having a projection that is partially received within said wire driving roller groove, the wire drive assemblies of said wire measuring units being aligned with each other along a line generally perpendicular to said apparatus longitudinal axis, said apparatus further including a plurality of motors, individual motors being associated with individual wire measuring units, said motors being operatively connected to said wire driving rollers by individual transmission belts for transmitting drive to said wire measuring units.

2. The multi-wire measuring apparatus of claim 1, wherein said wire driving rollers each include a plurality of teeth circumferentially disposed around said outer peripheral surfaces thereof and flanking said groove, and said transmission belts include toothed belts that engage said wire driving roller teeth.

3. The multi-wire measuring apparatus of claim 1, wherein said motors are spaced apart from said wire driving rollers.

4. The multi-wire measuring apparatus of claim 3, wherein said motors are disposed in a vertical array and said wire driving rollers are disposed in a horizontal array.

5. The multi-wire measuring apparatus of claim 1, further including means for biasing said wire pressure rollers partially into said wire driving roller grooves.

6. The multi-wire measuring apparatus of claim 5, wherein said biasing means includes pressure springs.

7. The multi-wire measuring apparatus of claim 1, wherein said wire pressure rollers are disposed above said wire driving rollers.

8. The multi-wire measuring apparatus of claim 2, wherein said wire driving roller teeth are integrally formed with said wire driving rollers.

9. The multi-wire measuring apparatus of claim 1, wherein said apparatus includes an outlet end and said wire measuring units are disposed in said apparatus proximate to said outlet end.

10. The multi-wire measuring apparatus of claim 1, wherein each of said wire measuring units includes a pair of wire drive assemblies spaced apart from each other along said wire feed path, and said apparatus includes a plurality of support rollers disposed between and on opposite sides of said wire drive assembly wire driving rollers, the support rollers supporting said transmission belt.

11. The multi-wire measuring apparatus of claim 1, wherein said wire driving rollers are rotatably supported on axles extending between two sidewalls of said apparatus.

12. The multi-wire measuring apparatus of claim 1, wherein each of said wire measuring units includes a pair of wire drive assemblies spaced apart from each other along said wire feed path and said wire measuring units include a biasing member extending between said wire pressure rollers of said wire drive assemblies and biasing said wire pressure roller projection partially into said wire driving roller grooves.

13. A measuring apparatus for measuring lengths of a plurality of individual wires as they are fed along a feed path of the apparatus toward an outlet end of said apparatus, each of the wires having a center electrical conductive portion and an outer insulative portion surrounding the center portion, said apparatus comprising:

a plurality of wire measuring units arranged lengthwise along the apparatus feed path, each of the wire measuring units measuring a single wire of said plurality of wires, each of said wire measuring units being driven independently by a corresponding drive motor;

each of said wire measuring units including at least one wire drive assembly for independently driving one of said wires during measuring thereof by said wire measuring unit, each of said wire drive assemblies including a wire driving roller and a wire pressure roller, the wire driving roller having an outer peripheral surface with a wire-receiving groove formed therein, said wire driving roller further including a plurality of teeth circumferentially extending around said outer peripheral surfaces thereof and flanking said wire-receiving groove, and the wire pressure roller having a projection that is partially received within said wire driving roller wire-receiving groove, said wire drive assemblies of said wire measuring units further being aligned with each other along a wire pitch direction that extends generally perpendicular to said apparatus feed path;

said apparatus further including a plurality of drive motors individually associated with individual ones of said wire measuring units, the drive motors each including a drive member; and, said apparatus further including a plurality of individual transmission belts for transmitting drive to said wire measuring units, individual transmission belts extending between individual motors and individual wire driving rollers, said transmission belts included toothed portions disposed thereon that engage said wire driving roller teeth and said drive motor drive members.

14. The wire measuring apparatus as set forth in claim 13, further including means for biasing said wire pressure roller projections partially into said wire driving roller wire-receiving grooves.

15. The wire measuring apparatus as set forth in claim 14, wherein said wire pressure roller biasing means includes a spring extending between said wire pressure roller and said apparatus.

16. The wire measuring apparatus as set forth in claim 13, wherein said drive motors and said wire measuring units are disposed in different planes of said apparatus.

17. The wire measuring apparatus as set forth in claim 13, further including a plurality of support rollers that rotatably support said transmission belts in their extents between said drive motors and said wire measuring units.

18. The wire measuring apparatus as set forth in claim 13, wherein each of said wire measuring units includes a plurality of wire drive assemblies spaced apart lengthwise along said apparatus feed path, and said apparatus includes a plurality of support rollers interposed between said wire drive assemblies for supporting said transmission belts.

19. The wire measuring apparatus as set forth in claim 13, wherein said transmission belts are disposed beneath said wire driving rollers.

20. The wire measuring apparatus as set forth in claim 13, wherein said wire driving rollers are disposed along said wire feed path proximate to said apparatus outlet end.

* * * * *